Figures 1, 2:
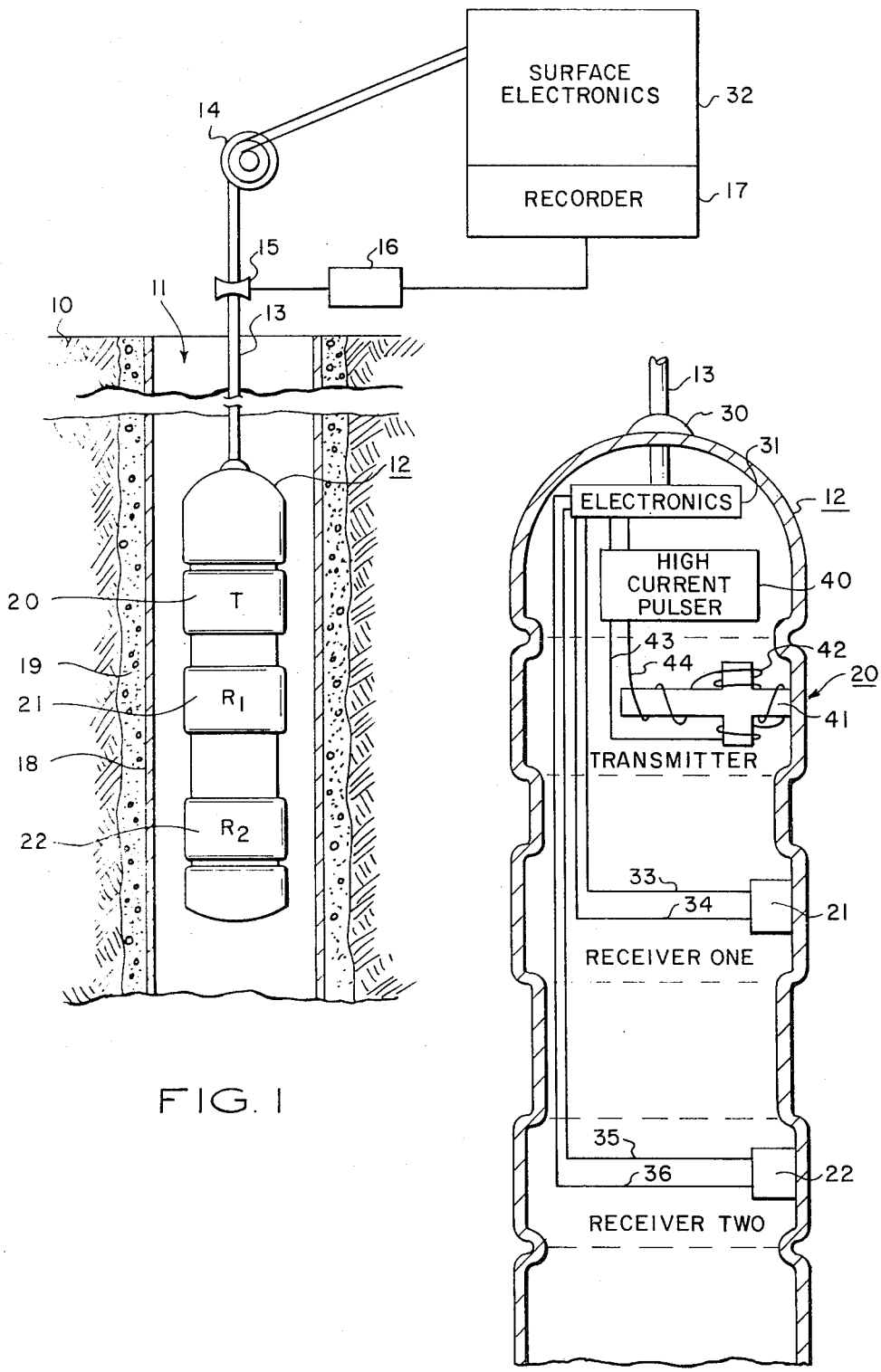

United States Patent [19]
Davis

[11] 3,752,257
[45] Aug. 14, 1973

[54] ACOUSTIC WELL LOGGING METHOD AND APPARATUS USING PIPE AS AN ACOUSTIC TRANSMITTER

[75] Inventor: Mike Davis, Houston, Tex.

[73] Assignee: Dresser Industries, Inc., Dallas, Tex.

[22] Filed: Mar. 7, 1972

[21] Appl. No.: 232,377

[52] U.S. Cl............ 181/.5 AG, 73/151, 181/.5 BE, 181/.5 AC
[51] Int. Cl............................................. E21b 49/00
[58] Field of Search................ 181/0.5 BE; 73/151, 73/152

[56] References Cited
UNITED STATES PATENTS
2,604,181  7/1952  Basham et al. ................ 181/0.5 BE
2,713,263  7/1955  Turner ........................... 73/67.9 X Primary Examiner—Jerry W. Myracle
Attorney—Robert W. Mayer, William E. Johnson, Jr. et al.

[57] ABSTRACT

A well logging tool using high voltage pulses coupled into a coil surrounding a high permeability material is caused to traverse an earth borehole having a metal pipe therein. The magnetic field resulting from the voltage pulses passing through the coil distorts the pipe and causes the pipe to be an acoustic transmitter. The acoustic pulses are passed through the earth formation to one or more acoustic receivers within the well logging instrument. The tool is used to measure acoustic velocity within the formations and also to measure the quality of the cement bond between the pipe and the earth formations.

3 Claims, 2 Drawing Figures

Patented Aug. 14, 1973 3,752,257

3,752,257

ACOUSTIC WELL LOGGING METHOD AND APPARATUS USING PIPE AS AN ACOUSTIC TRANSMITTER

BACKGROUND OF THE INVENTION

This invention relates to well logging in general and specifically to method and apparatus for creating a magnetic field within a pipe in an earth borehole for causing the pipe to act as an acoustic transmitter.

It is well known in the art to cause a well logging instrument to traverse an earth borehole wherein the instrument has one or more acoustic transmitters and one or more acoustic receivers whereby the acoustic signals are used to measure characteristics of the earth formations surrounding the borehole and also to measure the quality of the cement bond between pipe in the borehole and the earth formations. However, in such prior art systems, the acoustic transmitters are generally identical with the acoustic receivers, for example, piezoelectric transducers and other such transducers which in themselves create an acoustic impulse. While such systems have achieved numerous commercial successes in uncased boreholes, in cased boreholes the acoustic impulse is often hindered by the presence of well casing.

It is therefore the primary object of this invention to provide a new and improved method and apparatus for acoustic well logging;

It is a further object of the invention to provide method and apparatus for conducting an acoustic well log in cased boreholes;

It is yet a further object of the invention to provide a well logging instrument which creates a magnetic field in a cased borehole causing the steel casing to act as the acoustic transmitter;

It is still another object of the invention to provide method and apparatus for distorting a steel pipe in a cased borehole and utilizing the elastic restoring property of the pipe to cause it to become an acoustic transmitting apparatus.

The objects of the invention are accomplished, generally, by method and apparatus which cause a magnetic field to be created in the steel casing of an earth borehole to cause distortion within the pipe and which utilizes the elastic restoring property of the pipe to cause it to become an acoustic transmitting device. By repeatedly distorting the steel pipe during traversal of the earth borehole, one or more acoustic transducers are utilized to measure characteristics of the formations of the cement bond between the pipe and the formations.

These and other objects, features and advantages of the present invention will be more readily understood and appreciated by those in the art by a careful reading of the following detailed specification and drawing, in which:

FIG. 1 illustrates schematically a side elevation of a borehole instrument according to the invention shown in operative position in an earth borehole; and FIG. 2 illustrates schematically a side elevation and an enlarged view of the borehole instrument according to the invention.

Referring now to the drawing in more detail, and especially to FIG. 1, there is illustrated a portion of the earth's surface 10 traversed by an earth borehole 11. A well logging instrument 12 is suspended in the borehole by a logging cable 13, the cable 13 being wound on a drum 14 at the earth's surface. The cable 13 also passes over a measuring sheave 15 to drive a transmission 16 which in turn drives the recorder 17, for example, an X-Y plotter, so that the information recorded thereon from the surface electronics section is related to depth in the borehole. The interior of the borehole 11 has a steel pipe 18 therein which is bonded to the earth formation 10 by a cement sheath 19.

The well logging instrument 12 has a transmitter 20, labeled as "T," a first receiver 21, labeled as "R$_1$," and a second acoustic receiver 22, labeled as "R$_2$." The acoustic receivers 21 and 22 are conventional piezoelectric transducers, for example, like those illustrated in U.S. Pat. No. 3,542,150 to Arthur H. Youmans and James O. Guy, and assigned to the assignee of the present invention. By way of further example, such receiving transducers can both comprise a 1.5 inch diameter, .5 inch thick lead zirconate ceramic disc which are each mounted on a Teflon (polytetraflouroethylene) base. The transmitter 20, shown in more decail in FIG. 2, is arranged to create a magnetic field for reasons as set forth hereinafter.

Referring now to FIG. 2, the cable 13 passes through a conventional isolator 30 into the interior of the well logging instrument 12 which is shown in schematic. Suitable conductors within the cable 13 pass into the subsurface electronics section 31. For example, the subsurface electronics section 31 and the surface electronics 32 illustrated in FIG. 1 can correspond, if desired, to thatdisclosed in U.S. Pat. No. 3,019,413 to Adrian P. Brokaw, issued on Jan. 15, 1959, and assigned to the assignee of the pesent invention. The receiver 21 is connected into the subsurface electronics 31 by a pair of electrical conductors 33 and 34, whereas the receiver 22 is connected into the subsurface electronics 31 by a pair of electrical conductors 35 and 36.

A high current pulser circuit 40 is also connected to the electronics section 31 and synchronized therewith in such a manner as to deliver high current pulses to the transmitter 20. The transmitter 20 can be any transponder capable of creating a magnetic field within the steel pipe 18. However, the preferred embodiment contemplates that the transmitter 20 comprises a high permeability core 41 having coils of wire 42 wrapped thereabout in a conventional manner such that the application of high current pulses to the conductors 43 and 44 causes a strong magnetic field to be produced as an output of the transmitter 20. Although the high current pulser circuit 40 can be of any conventional design to produce high pulses within the transmitter 20, if desired, the circuit can be built in accordance with U.S. Pat. No. 3,539,835, issued on Nov. 10, 1970 to Ralph J. Hinze. By way of example, I found that C-shaped cores (not illustrated) and also rod-shaped ferrite cores having 100 turns of No. 18 wire develop approximately a 15 ampere current pulse through the coil of approximately 10 microseconds duration upon the application of a 1000 volt pulse from the high current pulser 40. Upon increasing the number of turns to two hundred on the same ferrite rod, a peak current of 60 amperes was obtained with a pulse duration of 20 microseconds. With such currents through the coil, a magnetic field was induced in the casing which produces a signal at a receiver 3 feet away of approximately 10 millivolts peak.

In the operation of the apparatus according to FIG.'s 1 and 2, the well logging instrument 12 is caused to traverse the borehole 11. During such traversal, high current pulses are applied to the transmitter 20 and a magnetic field is applied to the steel pipe 18 from the transmitter 20. Such a magnetic field causes a distortion within the pipe 18. However, the elastic restoring property of the pipe causes it to become an acoustic transmitting device. This causes an acoustic wave to travel through the cement sheath 19 into the formation 10. From the formation 10, the acoustic wave travels back through the cement sheath 19 and through the pipe 18 to the receivers 21 and 22 where Δ travel time between the receivers 21 and 22 is measured in a conventional manner in the electronics sections 31 and 32 and is recorded on the recorder 17 as a function of depth within the borehole. It should be appreciated that the acoustic receiving transducers 21 and 22 are substantially insensitive to the magnetic field from the transmitter 20 but are responsive to the acoustic signal which is transmitted from the pipe 18 resulting from the magnetic field. It should also be appreciated that energy losses due to refraction are thus greatly minimized as compared to conventional acoustic transmitting devices.

While the preferred embodiment contemplates that acoustic travel times within the formations can be measured by monitoring the travel time between the receivers 21 and 22, the device is also useful and is employed to detect the absence or presence of the cement sheath 19. It has been found that the apparatus according to the present invention produces a superior cement bond log since the steel pipe itself is the acoustic transmitting device.

While the preferred embodiments have been illustrated and described herein, it should be appreciated that modifications thereof will be apparent to those skilled in the art from a reading of the foregoing detailed specification. For example, while the preferred embodiment contemplates a pair of receivers 21 and 22, the apparatus can also use one receiver or more than two receivers, for example, three or four receivers. It should also be appreciated that means other than those illustrated can be used to create a magnetic field within the steel pipe to cause the pipe to become an acoustic transmitter.

The embodiments of the invention in which an exclusive property or privilege is claimed are defined as follows:

1. An acoustic well logging apparatus for logging a steel-cased earth borehole, comprising:
   an elongated housing adapted to traverse an earth borehole;
   at least one acoustic receiving transducer mounted in said housing; and
   means mounted in said housing for creating a magnetic field in the steel casing within the bore to cause said casing to transmit acoustic waves in response to said magnetic field.

2. In an acoustic well logging apparatus for logging cased earth boreholes and having at least one acoustic receiving transducer, the improvement comprising means within the apparatus to distort said casing an amount such that said casing creates an acoustic wave in a manner functionally related to such distortion.

3. A method for acoustically logging a cased earth borehole, comprising:
   traversing said borehole with an elongated instrument having at least one acoustic receiving transducer;
   repetitively creating a magnetic field in said casing of strength adequate to distort said casing in the vicinity of said instrument whereby said casing creates an acoustic wave in response to said distortion; and
   monitoring said acoustic waves.

* * * * *